US011378646B2

(12) United States Patent
Kuzdeba et al.

(10) Patent No.: US 11,378,646 B2
(45) Date of Patent: Jul. 5, 2022

(54) RF FINGERPRINT ENHANCEMENT BY MANIPULATION OF AN ABSTRACTED DIGITAL SIGNAL

(71) Applicant: BAE SYSTEMS Information and Electronic Systems Integration Inc., Nashua, NH (US)

(72) Inventors: Scott A Kuzdeba, Framingham, MA (US); Amit Bhatia, Apex, NC (US); David J. Couto, Pepperell, MA (US); Denis Garagic, Wayland, MA (US); John A. Tranquilli, Jr., Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 486 days.

(21) Appl. No.: 16/539,578

(22) Filed: Aug. 13, 2019

(65) Prior Publication Data

US 2021/0048507 A1    Feb. 18, 2021

(51) Int. Cl.
*G01S 5/02* (2010.01)
*G01S 7/02* (2006.01)
*G06N 20/00* (2019.01)

(52) U.S. Cl.
CPC ............ *G01S 7/021* (2013.01); *G01S 5/0252* (2013.01); *G06N 20/00* (2019.01)

(58) Field of Classification Search
CPC ........ G01S 5/0252; G01S 7/021; G06N 20/00
(Continued)

(56) References Cited

U.S. PATENT DOCUMENTS

| 2021/0048507 A1* | 2/2021 | Kuzdeba | G01S 7/417 |
| 2021/0337468 A1* | 10/2021 | Alpert | H04W 4/70 |

FOREIGN PATENT DOCUMENTS

| CN | 105813022 A | * | 7/2016 | ............... H04W 4/04 |
| CN | 108960138 B | * | 7/2019 | ......... G06K 17/0022 |

OTHER PUBLICATIONS

Almousli, H., Vincent, P., "Semi Supervised Autoencoders: Better Focusing Model Capacity During Feature Extraction," ICONIP, pp. 328-335, (2013).

(Continued)

*Primary Examiner* — Harry K Liu
(74) *Attorney, Agent, or Firm* — Maine Cernota & Rardin; Scott J. Asmus

(57) ABSTRACT

The discriminability of an RF fingerprint is increased by "abstracting," "enhancing," and "reconstructing" a digital signal before it is transmitted, where the abstraction is a reversible nonlinear compression, the enhancement is a modification of the abstracted data, and the reconstruction is a mapping-back of the abstraction. During a training phase, for each individual RF transmitter, RF fingerprints are analyzed and candidate enhancements are modified until a successful enhancement is identified that provides satisfactory discriminability improvement with minimal signal degradation. The successful enhancement is implemented in the RF transmitter, and the RF fingerprint is communicated to receivers for subsequent detection and verification. Reinforcement learning can direct modifications to the candidate enhancements. The abstraction can implement a deep generative model such as an auto-encoder. A covert data enhancement can encode covert data onto the RF fingerprint, whereby the covert data is transmitted covertly to a receiver.

21 Claims, 7 Drawing Sheets

(58) Field of Classification Search
USPC .................................................. 342/357.77
See application file for complete search history.

(56) References Cited

OTHER PUBLICATIONS

Mirowski, P., Ranzato, M., LeCun, Y., "Dynamic Auto-Encoders for Semantic Indexing," In Proceedings of the NIPS Workshop on Deep Learning. (2010).
Hinton, G., Salakhutdinov, R., "Reducing the Dimensionality of Data with Neural Networks," Science. vol. 313. No. 5786, pp. 504-507, (2006).

* cited by examiner

RF FINGERPRINT ENHANCEMENT BY MANIPULATION OF AN ABSTRACTED DIGITAL SIGNAL

FIELD

The disclosure relates to methods of identifying RF transmission sources, and more particularly to methods of RF fingerprint recognition.

BACKGROUND

During combat, it can be important to detect the locations of both friendly and hostile forces, and to differentiate between them. Often, the locations of RF transmitting sources can be determined by triangulation of their transmissions and/or other means. For that reason, when transmitting RF signals, hostile RF sources sometimes make efforts to disguise their transmissions, such that they will appear to originate from friendly forces, thereby delaying or preventing their identification as being hostile.

Digital signatures and similar measures can be effective for verifying the authorship of a message. However, using "man in the middle" and similar re-transmission gambits, these digital methods can be spoofed, such that a hostile transmission source may appear, at least temporarily, to be a friendly source. Furthermore, digital signatures cannot typically be applied to certain RF transmitting sources, such as RADAR transmitters, that transmit RF for purposes other than data exchange. It should be noted that the term RF is used herein to refer to electromagnetic transmissions of all types and at all frequencies, including but not limited to optical emissions, terahertz transmissions, microwaves, short waves, "long" waves, etc.

One approach is to utilize RF "fingerprinting" to identify the sources of received RF transmissions. This approach takes advantage of the fact that RF transmissions are fundamentally analog in nature, even though they may convey digitized messages. With reference to FIG. 1, a typical RF transmitter 100 may begin with a digital input 102, but virtually all of the elements downstream of the input are analog in character. In FIG. 1, the digital input 102 is encoded and then converted to an analog signal by a digital-to-analog converter (DAC) 104.

The encoding may be simply in the form of amplitude pulses to be applied to an RF carrier wave, or it may also include modulation of the phase and/or frequency of the carrier wave. For example, with reference to FIG. 2, so-called "IQ" encoding (In-phase and Quadrature encoding) can distribute RF "pulses" within a two-dimensional "phase" space. In FIG. 2, for example, the pulses all have the same amplitude and are distributed among four possible phases, providing a "base-4" encoding rather than the "base-2" encoding that is used e.g. in the circuitry of computing devices. The distribution of the individual pulses within the four dashed circles indicates variations of amplitude and phase of the received pulses that arise due to noise, environmental factors, and hardware nonlinearities of the transmitter and receiver electronics.

With continued reference to FIG. 1, a typical RF transmitter 100 may further direct the analog signal through a tunable bandpass filter 106, and to a mixer 112 that may shift the RF carrier frequency from an "intermediate" frequency to a final transmission frequency, whereby the mixer 112 is driven by a synthesizer 108, which in turn is driven by a frequency reference or "clock" 110. Another tunable bandpass filter 114 may then be applied, followed by an amplifier 116 and yet another tunable bandpass filter 118, after which the analog RF output 120 is directed to the transmitting antenna 122.

While the details of FIG. 1 are presented only by way of representative example, it is virtually always the case that a signal in an RF transmitter is subject to multiple stages of analog manipulation downstream of the DAC, all of which can and will, in principle, introduce unintended nonlinearities into the signal.

The precise nature of these unintentional nonlinearities will vary to some extent between electronic modules, even if they are supposed to be identical, due to tolerance variations that are introduced during manufacture. In other words, no two electronic modules are ever exactly identical, even when they are produced in the same way, by the same personnel, and using the same equipment. A certain degree of random variation is always present, and cannot be avoided. For that reason, each analog electronic module, and hence each transmitter 100, will introduce unique variations into the amplitude, phase, frequency and time profile of each transmitted pulse. For example, the rise and fall times may be different, the phase "transients" (i.e. phase variation patterns during the pulse rise and fall times) may be different. Pulse amplitudes may vary as a function of the RF phase and/or frequency. And so forth.

To the degree that these transmission peculiarities can be detected and distinguished, they can sometimes be used as "watermarks" or "fingerprints" to uniquely identify a transmission source. And because they arise from minute differences in a multitude of physical aspects of the electronics, they can be very difficult to analyze, predict, and spoof.

However, RF fingerprints can be difficult to detect. In general, the phase and amplitude variations that are observed in received RF pulses, as indicated for example by the point distributions within the dashed circles of FIG. 2, arise from many sources, including noise, interference, atmospheric effects, signal reflections and echoes, motion artifacts, and nonlinearities in the receiving electronics. Furthermore, many of these sources of phase, amplitude, and timing fluctuation can vary with temperature, vibration, and other environmental causes.

RF fingerprinting is only effective if the unique analog distortions that arise from nonlinearities in the transmitter can be discriminated from all of the other sources of distortion and noise. This is sometimes referred to as the "discriminability" of the RF fingerprint. Furthermore, engineered manipulations of an RF fingerprint can be self-defeating because they are not unique to a specific device. For example, if a certain non-linearity is intentionally introduced into a transmitted signal, for example by miss-tuning a filter, it will likely be easy for a hostile entity to duplicate and spoof the non-linearity. Indeed, RF fingerprints are difficult to spoof mainly because they arise from a large number of minute imperfections of the transmitter that are not easily controlled or characterized. Accordingly, it can be difficult to find ways to intentionally enhance the discriminability of RF fingerprints without rendering them easy to replicate and spoof.

Also, because an RF fingerprint is fundamentally a distortion of a transmitted signal, the RF fingerprint of the transmitter must not be so large as to compromise the primary purpose of the transmission. For example, the bit-error rate of a received message must not be unduly increased, or the accuracy of a RADAR detection must not be unduly diminished, due to enhancement of a digital fingerprint.

What is needed, therefore, is a method of enhancing the discriminability of an RF fingerprint of an RF transmission source so that the fingerprint can be reliably detected and identified, without rendering the RF fingerprint unduly easy to emulate, and without unduly interfering with the primary purpose of the RF transmission.

SUMMARY

The present disclosure is a method of improving the discriminability of an RF fingerprint of an RF transmission source so that the fingerprint can be reliably detected and identified, without rendering the RF fingerprint unduly easy to emulate, and without unduly interfering with the primary purpose of the RF transmission. According to the disclosed method, a digital signal is "abstracted," "enhanced," and then "reconstructed" before it is converted by a DAC into analog pulses and transmitted by an RF transmission source. The "enhancement" of the abstracted digital data is selected such that it causes the discriminability of the RF fingerprint to be increased, e.g. makes it more likely that a receiver will be able to accurately detect and identify the RF fingerprint.

For each individual RF transmission source, during an initial training phase candidate enhancements are applied and varied, and the resulting RF transmissions are analyzed to detect the resulting RF fingerprint, for example using a deep regenerative model (DGM) combined with Hierarchical Bayesian Program Learning (HBPL). The RF transmissions are also evaluated to determine a degree of success in accomplishing the primary purpose of the signal, so as to rule out candidate enhancements that significantly degrade the ability of the RF transmission to accomplish its primary purpose. This process continues until a specific enhancement is identified that will provide an optimal increase in the discriminability of the RF fingerprint of that specific RF transmission source, with minimal negative impact on the primary purpose of its RF transmissions. In embodiments, reinforcement learning, which can also apply DGM combined with HBPL, is used to direct the modifications to the candidate enhancements through a learned and informed framework that is data-driven.

During operation, both the RF fingerprint of the RF transmission source and the abstraction method that is being utilized are made known to the receiver. In embodiments, the receiver is also aware of the specific, "successful" enhancement that has been implemented in that RF transmission source. This information is applied by the receiver of the RF transmissions to isolate, detect, and verify the RF fingerprint in the presence of noise and other distortions.

Several terms are used herein with specific meanings, as follows:

The term "abstraction" is used herein to refer generally to any reversible, non-linear data compression method, whereby data is converted into a more compact format, from which it can be accurately "reconstructed" or "mapped back" to its original form. In embodiments, a generative approach such as a deep generative model (DGM) is used as the abstraction method. In some of these embodiments, an "auto-encoder" is used as the method of abstraction. While not widely used herein, it should be noted that terms such as "lower dimensional", "latent", and "embedded" are sometimes used in the art to refer to certain reversible, non-linear data compression methods, including auto-encoders, because such methods are often applied to "two-dimensional" data such as digital images, whereby compression of the data reduces the number of "pixels" in each dimension of the image.

The term "enhancement" as applied to abstracted data is used herein to refer generally to any adjustment, manipulation, or modification of the abstracted data. When applied to an RF fingerprint, the term "enhanced" refers to a modification of the fingerprint that increases its "discriminability," i.e. the likelihood that a receiver will accurately detect and identifying the RF fingerprint even in the presence of noise, interference, atmospheric and environmental distortions, etc. The term "enhancement" is used herein because it suggests the goal of the present method, which is to apply a modification to the abstracted data that will "enhance" the success of using RF fingerprints to accurately identify RF transmission sources.

The terms "reconstructed" and "reconstruction" are used herein to refer to application of a "mapping back" algorithm to abstracted data. If the abstracted data is unmodified, then the reconstruction process will return the data to its original status. However, according to the present method the abstracted data is enhanced, i.e. modified, before it is reconstructed. Accordingly, reconstruction after enhancement will map back the enhancements together with the data, such that the reconstructed data will not be identical to the original data. In embodiments, a generative approach such as a deep generative model (DGM) is used as the reconstruction method. In some of these embodiments, an "auto-encoder" is used as the method of reconstruction.

The term "primary purpose" is used herein to refer to the primary goal that is to be accomplished by an RF transmission. For example the primary purpose of a communication transmission is to convey a message accurately to the receiver. The primary purpose of a microwave transmission by a RADAR apparatus is to accurately detect the location and velocity vector of a remote object, and so forth The terms "radio frequency" and "RF" are used broadly herein to refer to all wireless electromagnetic transmissions, including optical, infrared, and microwave transmissions. For example, LASER communications and microwave transmissions used for RADAR are included within the term "RF" as used herein.

In embodiments, the disclosed process of abstraction, enhancement, and restoration is applied to the data after it has been encoded in time/phase/frequency space, e.g. as an IQ signal, but before it has been converted by a DAC from digital information into analog RF pulses.

The enhancement has both a direct effect and an indirect effect on the transmitted signal. The direct effect arises from the modification of the abstracted data, which results in modifications to the reconstructed and transmitted data, and would be present even if there were no RF fingerprint, i.e. even if the RF transmission source were an ideal transmitter without nonlinearities.

The indirect effect of the enhancement arises because of the non-linear nature of the RF fingerprint, such that modifications to the transmitted data imposed by the enhancement result in consequential, indirect changes to the RF fingerprint. This indirect effect of the enhancement on the RF fingerprint is fundamental to the present disclosure.

It is important to note that there is a complex and intimate interaction between the "enhancement" that is applied to the abstracted digital data and the resulting changes to the analog RF fingerprint of the RF transmission source. In particular, the enhancement does not simply add to the RF fingerprint, nor does it modify or modulate the RF fingerprint in any simple manner. The interaction between the enhancement and the RF fingerprint is ultimately an analog phenomenon, being the result of interactions between changes to the phase/frequency/amplitude of the RF pulses, as produced by the DAC, and a multitude of nonlinearities, resonances, and other analog electronic and structural features of the transmitter modules that are downstream of the DAC.

It is therefore fundamental to the present disclosure that it does not depend upon a detailed analysis of the origins of the RF fingerprint, nor does it depend on predicting the effects of an enhancement on the discriminability of the RF fingerprint. Indeed, the difficulty of performing such analyses goes to the heart of why RF fingerprints are nearly impossible to duplicate, predict, or spoof. Instead, the present method depends upon an approach whereby candidate "enhancements" are selected and applied to the abstracted data, and the resulting changes to the detected RF fingerprint are detected, for example using a deep regenerative model (DGM) combined with Hierarchical Bayesian Program Learning (HBPL), and analyzed for changes in discriminability. The candidate enhancements are then modified and the analysis is repeated until a "successful" enhancement of the RF fingerprint is identified. Embodiments apply sophisticated machine learning methods, such as deep learning and reinforcement learning, to direct the variation of the candidate enhancements during the training phase. Embodiments apply DGM and HBPL to the machine learning. In embodiments, the effects on the RF fingerprint of specific variations of the candidate enhancement are explored, such as the effects of varying the enhancement along individual dimensions within the "reduced" dimensionality of the abstracted space. However, no detailed analysis is attempted as to how various specific and individual elements within the transmitter will respond to the candidate enhancements, or how they will contribute to the overall RF fingerprint.

In some embodiments, rather than seeking an enhancement that will maximize the discriminability of the RF fingerprint, covert data such as a covert message is applied to the abstracted signal as the enhancement. This approach has the effect of encoding the covert data into the abstracted signal before it is reconstructed and transmitted according to the same process as the RF fingerprint enhancement method described above, except that the goal in these embodiments is not to increase the discriminability of the RF fingerprint, but rather to impose additional, covert information onto the RF fingerprint that will be difficult to detect without knowledge of the RF fingerprint. Furthermore, because the covert data is applied to the digital data in its abstracted form, before the data is reconstructed, the difficulty of detecting the presence of covert information encoded with the RF signal is greatly increased.

For example, in embodiments the effects on the RF fingerprint of specific perturbations of the abstracted signal are explored and characterized, such as effects of perturbing the abstracted signal along individual dimensions within the dimensionality of the abstracted space. Once these relationships have been characterized by analysis of results obtained during the training phase, they can be used to encode covert data onto the RF fingerprint by representing the covert data as specific perturbations of the abstracted signal that will result in detectable perturbations of the RF fingerprint. The covert data can then be recovered from the received signal by observing variations in the detected RF fingerprint and applying the known relationships between perturbations of the abstracted signal and corresponding RF fingerprint variations.

The encoded covert data thereby operates in these embodiments as a covert data "enhancement" that is applied to the abstracted signal in a manner that is similar to the method described above, except that the primary goal of the covert data enhancement is to encode the covert data onto the RF fingerprint, rather than to enhance the discriminability of the RF fingerprint. Nevertheless, in some embodiments the covert data enhancement accomplishes both goals, i.e. encodes the covert data onto the RF fingerprint and also enhances the discriminability of the RF fingerprint.

Note that various embodiments directed to increasing the discriminability of the RF fingerprint typically apply time invariant enhancements to the abstracted signal, whereas embodiments that encode and transmit covert data according to the present method typically require application of a time varying covert data enhancement to the abstracted signal, which results in a time-varying fluctuations of the RF fingerprint.

A first general aspect of the present disclosure is a method of detecting an RF fingerprint of an RF transmission source. The method includes:
A) abstracting a digital signal by applying thereto a non-linear data compression method that can be reconstructed by a mapping back method, said digital signal having a primary purpose;
B) enhancing the abstracted digital signal by applying an operational enhancement thereto;
C) reconstructing the enhanced, abstracted digital signal by applying thereto the mapping back method;
D) causing the RF transmission source to convert the reconstructed enhanced digital signal into an enhanced analog signal, and to transmit the enhanced analog signal to a receiver;
E) causing the receiver to convert the enhanced analog signal into an enhanced received digital signal;
F) abstracting the enhanced received digital signal by applying thereto the non-linear data compression method; and
G) detecting an RF fingerprint included in the abstracted enhanced received digital signal.

In some embodiments, the primary purpose of the digital signal is communication of data to the receiver, while in other embodiments the primary purpose of the digital signal is detection of a remote object by RADAR.

In any of the above embodiments, the non-linear data compression method used for abstraction in steps A) and F) can use a generative approach. In some of these embodiments, the generative approach is a deep generative model (DGM), and in some of these embodiments the non-linear data compression method that is used for abstraction in steps A) and F) includes representing the signal as a layer within the DGM, said layer being characterized by a plurality of nodes having corresponding weights, and wherein the enhancement that is applied in step B) includes altering at least one of the weights of the layer.

In any of the above embodiments, the non-linear data compression method used for abstraction in steps A) and F) can be an auto-encoder.

In any of the above embodiments, detecting the RF fingerprint in step G) can include application of a deep regenerative model (DGM) to the abstracted enhanced received digital signal. In some of these embodiments, detecting the RF fingerprint in step G) further includes applying Hierarchical Bayesian Program Learning (HBPL) to the abstracted enhanced received digital signal.

In any of the above embodiments, the operational enhancement can be determined according to a training phase that includes:
 I) applying steps A) through G) using a candidate enhancement in step B);
 II) determining a discriminability of the RF fingerprint detected in step G);
 III) determining a degree of success in accomplishing the primary purpose of the digital signal;
 IV) repeating steps I) through III), each time with a modified candidate enhancement, until a successful enhancement is identified for which the discriminability of the RF fingerprint is greater than a defined minimum discriminability, and the degree of success in accomplishing the primary purpose of the digital signal is greater than a defined minimum degree of success; and
 V) designating the successful enhancement as the operational enhancement.

In some of these embodiments, reinforcement learning is used in step IV) to direct the modifications to the candidate enhancements through a learned and informed framework that is data-driven. In some of these embodiments the reinforcement learning includes applying a deep regenerative model (DGM) to the candidate enhancements. And in some of these embodiments the reinforcement learning further includes applying Hierarchical Bayesian Program Learning (HBPL) to the candidate enhancements.

A second general aspect of the present disclosure is a method of conveying covert data from an RF transmission source to a receiver. The method includes:
 abstracting a digital signal by applying thereto a non-linear data compression method that can be reconstructed by a mapping back method;
 encoding the covert data as a covert data enhancement;
 enhancing the abstracted digital signal by applying the covert data enhancement to the abstracted digital signal;
 reconstructing the enhanced, abstracted digital signal by applying thereto the mapping back method;
 causing the RF transmission source to convert the reconstructed enhanced digital signal into an enhanced analog signal, and to transmit the enhanced analog signal to the receiver;
 causing the receiver to convert the enhanced analog signal into an enhanced received digital signal;
 abstracting the enhanced received digital signal by applying thereto the non-linear data compression method;
 detecting an RF fingerprint included in the abstracted enhanced received digital signal;
 extracting the covert data enhancement from the RF fingerprint; and
 recovering the coded data from the extracted covert data enhancement.

Embodiments further include characterizing effects of perturbing the abstracted signal along individual dimensions within the dimensionality of the abstracted space, and wherein encoding the covert data as a covert data enhancement includes encoding the covert data as specific perturbations of the abstracted signal that will result in detectable perturbations of the RF fingerprint.

In any of these embodiments, the primary purpose of the digital signal can be communication of data to the receiver, or detection of a remote object by RADAR.

In any of the above embodiments, the non-linear data compression method can use a generative approach. In some of these embodiments, the generative approach is a deep generative model (DGM). And in some of these embodiments the non-linear data compression method includes representing the signal as a layer within the DGM, said layer being characterized by a plurality of nodes having corresponding weights, and wherein the enhancement that is applied in step B) includes altering at least one of the weights of the layer.

In any of the above embodiments, the non-linear data compression method used for abstraction can be an autoencoder.

In any of the above embodiments, detecting an RF fingerprint included in the abstracted enhanced received digital signal can include applying a deep regenerative model (DGM) to the abstracted enhanced received digital signal. In some of these embodiments, detecting the RF fingerprint included in the abstracted enhanced received digital signal further includes applying Hierarchical Bayesian Program Learning (HBPL) to the abstracted enhanced received digital signal.

A third general aspect of the present disclosure is an RF signal source that includes a digital to analog converter (DAC), an RF amplifier, a transmitting antenna, and an RF preprocessor. The RF preprocessor is configured to:
A) accept a digital signal as an input, and abstract the digital signal by applying thereto a non-linear data compression method that can be reconstructed by a mapping back method, said digital signal having a primary purpose;
B) enhance the abstracted digital signal by applying an operational enhancement thereto;
C) reconstruct the enhanced, abstracted digital signal by applying thereto the mapping back method;
D) cause the DAC to convert the reconstructed enhanced digital signal into an enhanced analog signal;
E) cause the RF amplifier to amplify the enhanced analog signal; and
F) cause the transmitting antenna to transmit the enhanced analog signal.

A fourth general aspect of the present disclosure is an RF signal receiver that includes a receiving antenna, configured to receive an enhanced analog signal transmitted by an RF signal source, said enhanced analog signal having been derived from a digital signal that was enhanced after application thereto of a non-linear data compression method that can be reconstructed by a mapping back method, said enhanced analog signal having a primary purpose, an analog signal preamplifier, configured to amplify the enhanced analog signal received by the receiving antenna, an analog to digital converter (ADC), configured to convert the amplified enhanced analog signal into an enhanced received digital signal, and n RF postprocessor. The RF postprocessor is configured to:
A) accept the enhanced received digital signal from the ADC;
B) abstract the enhanced received digital signal by applying thereto the non-linear data compression method; and
C) detect an RF fingerprint of the RF signal source included in the abstracted enhanced received digital signal.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a method of improving the discriminability of an RF fingerprint of an RF transmission source so that the fingerprint can be reliably detected and identified, without rendering the RF fingerprint unduly easy to emulate, and without unduly interfering with the primary purpose of the RF transmission. According to the disclosed method, a digital signal is "abstracted," "enhanced," and then "reconstructed" before it is converted by a DAC into analog pulses and transmitted by an RF transmission source.

Figure 1:
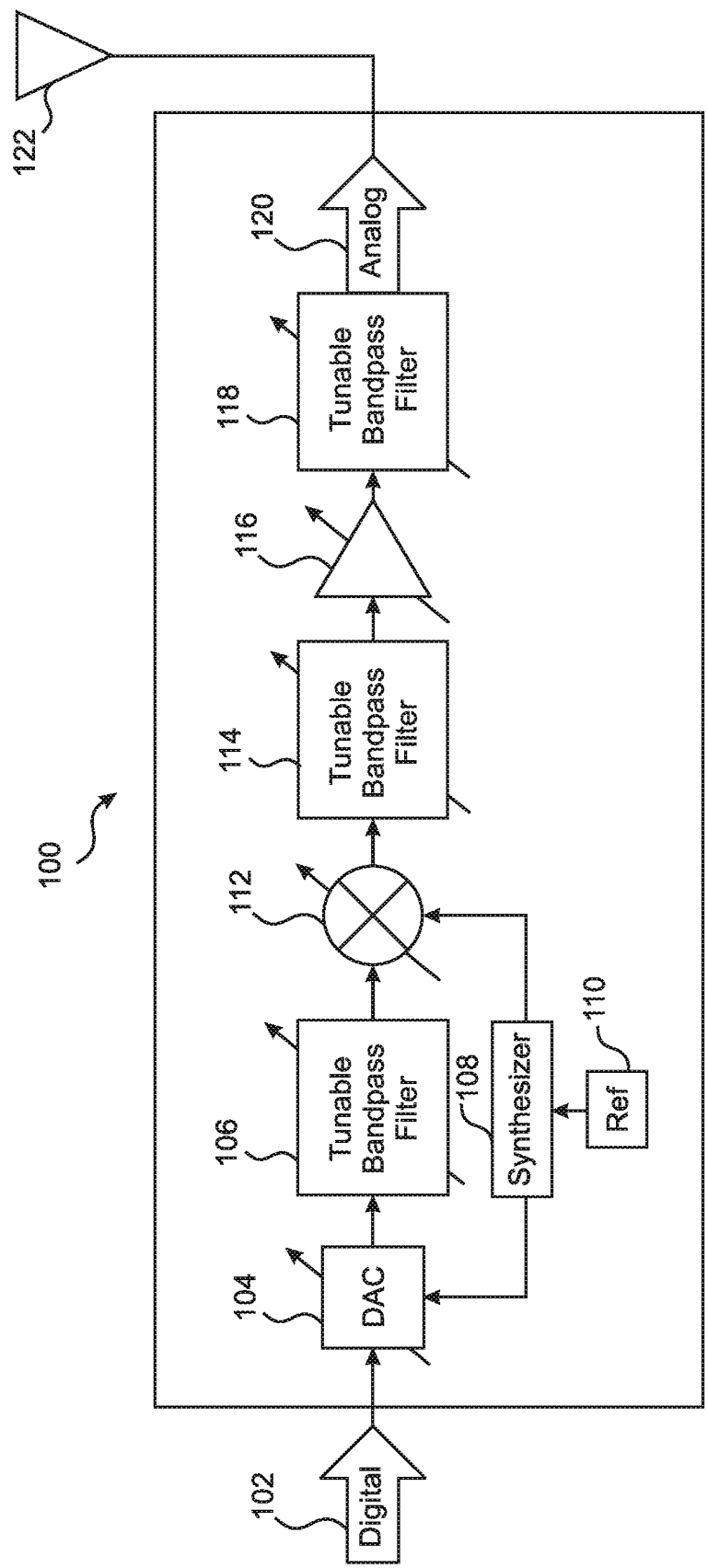
FIG. 1 is a block diagram that illustrates elements of a typical RF transmission source of the prior art.
Figure 2:
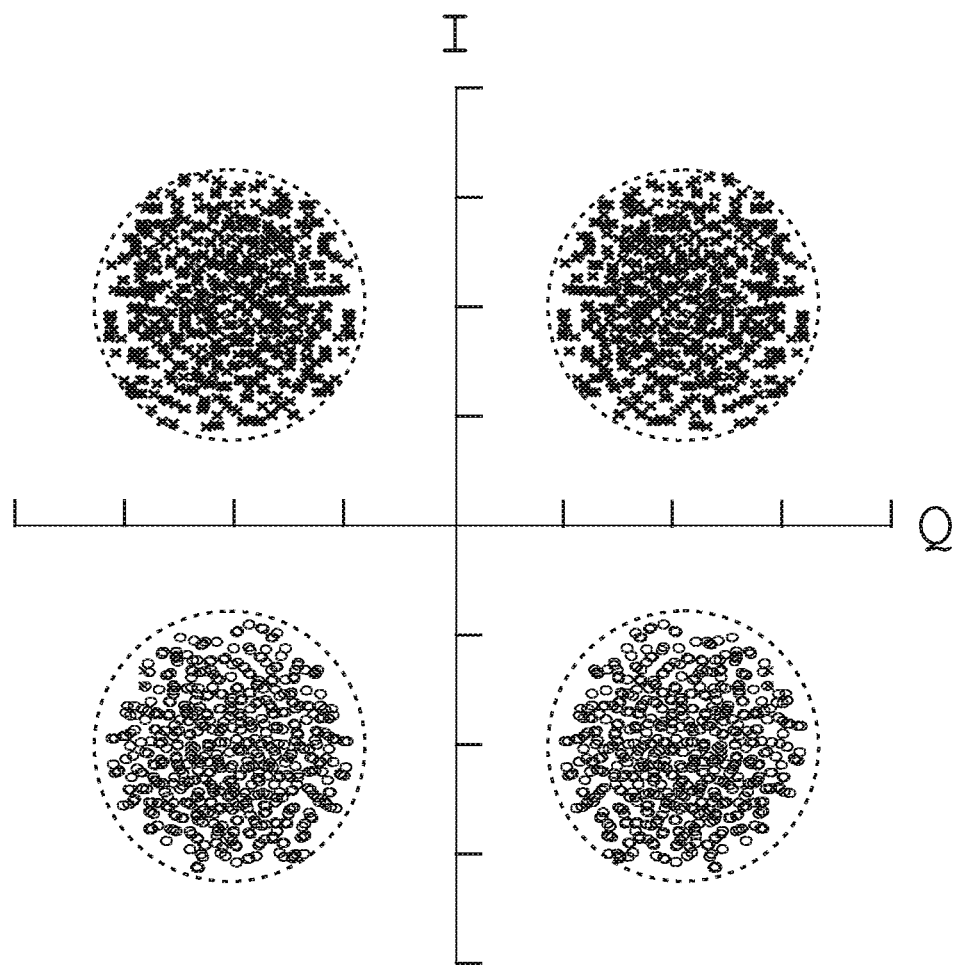
FIG. 2 is a graph that illustrates an example of IQ encoded data as received with noise and other distortions according to the prior art.
Figure 3:
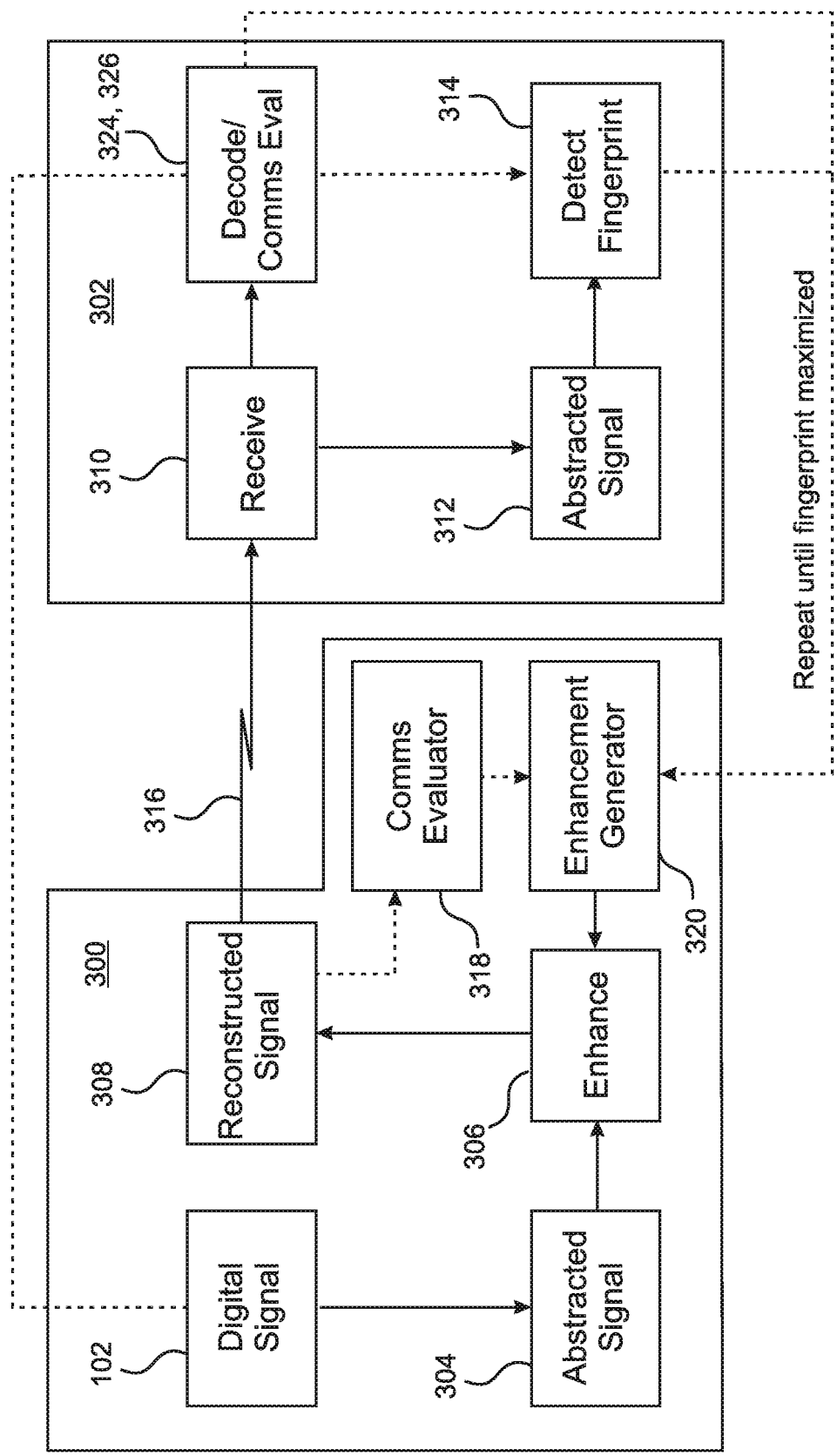
FIG. 3 is a flow diagram that illustrates an embodiment of the disclosed method during a training phase.

With reference to FIG. 3, the enhancement that will be applied to the abstracted digital data during an operational phase by a specific RF transmission source 300 is selected during an initial training phase. During the training phase, a digital signal 102, which can be encoded in time/phase/frequency space, e.g. as an IQ signal, is transformed to an abstracted digital signal 304 by application of a reversible, non-linear data compression method to the digital signal. In embodiments, a generative approach such as a deep generative model (DGM) is used as the abstraction method. In some of these embodiments, an "auto-encoder" is used as the method of abstraction, as is described for example in Hinton, G., Salakhutdinov, R., "Reducing the Dimensionality of Data with Neural Networks," Science. Vol. 313. no. 5786, pp. 504-507, (2006), in Almousli, H., Vincent, P., "Semi Supervised Autoencoders: Better Focusing Model Capacity During Feature Extraction," ICONIP, pp. 328-335, (2013), and in Mirowski, P., Ranzato, M., LeCun, Y., "Dynamic auto-encoders for semantic indexing," In Proceedings of the NIPS Workshop on Deep Learning. (2010), all of which are incorporated herein by reference for all purposes.

An initial candidate enhancement is applied 306 to the abstracted digital signal 304, after which the enhanced digital signal is reconstructed 316, i.e. "mapped back." "Reconstructing" and "mapping back" refer herein to applying a method to the data that reverses the abstraction. In other words, if the abstracted signal were unmodified, then the mapping back process would return the signal to its original status. However, due to application of the candidate enhancement 306 to the abstracted signal 304, the reconstructed digital signal 308 that is transmitted 316 will not be identical to the original digital signal 102. In embodiments, the reconstructed digital signal 308 is evaluated by a communications evaluator 318 to determine a degree of success of the reconstructed digital signal in accomplishing the primary purpose of the signal. For example, in the case of a digital signal that conveys a message, embodiments of the communications evaluator 318 estimate any expected increase in bit error rate of the reconstructed digital signal.

Initially, the candidate enhancement 306 can be selected according to a heuristic approach, and can be almost any modification applied to the abstracted signal 304. In embodiments, enhancements that have been found successful for other, nominally identical or similar transmission sources are used as initial candidate enhancements. In various embodiments the signal is represented as a layer within a deep generative model (DGM), wherein a "weight" is associated with each node or "dimension" of the layer, and the candidate enhancements are configured as alterations of the weights of the DGM layer.

The reconstructed digital signal is then converted to an analog signal by a DAC (not shown) and transmitted 316 by the RF source. During the training phase, the transmission 316 is directed to a training receiver 302 either over a very short distance or even over a coaxial cable, so that virtually no noise or other artifacts are introduced into the received signal 310. Of course, there will be some nonlinearities introduced by the analog elements of the receiver 302, but these will remain constant throughout the training phase. In embodiments, controlled noise and other artifacts are introduced to model how the fingerprint and enhancements are affected by other sources of variance.

Figure 4A:
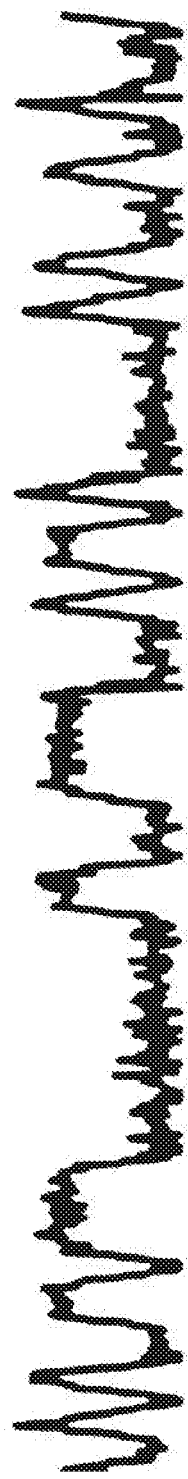
FIG. 4A is an illustration of a received waveform carrying a signal to which enhancement has not been applied.
Figure 4B:
FIG. 4B is an illustration of a received waveform carrying the signal of FIG. 4A to which an enhancement has been applied.

After being digitized, the received signal 310 is transformed to an abstracted received signal 312, using the same abstraction algorithm 304 that was used by the transmission source 300. Due to the nonlinearities of the analog elements of the transmitter, the abstracted received signal will comprise information related to both the applied enhancement 306 and the RF fingerprint of the transmitter 100. Notably, the applied enhancement 306 will be manifested in the abstracted received signal 312 two ways. First, the enhancement will have a direct effect, in that the modifications to the abstracted signal 304 resulting from the enhancement will be present. An example is presented in FIGS. 4A and 4B, where 4A illustrates a received signal resulting from a digital signal to which enhancement was not applied, and FIG. 4B presents a received signal resulting from the same digital signal, where enhancement was applied. The direct result of the enhancement is clearly visible from a comparison of the two figures. In embodiments, the enhancement is known to the receiver 302.

In addition, the enhancement will have an indirect effect on the received signal, in that the RF fingerprint of the transmitter will be affected due to the perturbation of the digital signal by the enhancement. This is because the RF fingerprint is a direct result of non-linear properties of the transmitter, which cause the RF fingerprint to react in a non-linear and unpredictable manner to changes in the transmitted signal 316. This gives rise to a complex and intimate interaction between the "enhancement" that is applied 306 to the abstracted digital data and the resulting changes to the analog RF fingerprint of the RF transmission source. In particular, the enhancement is not simply added to the RF fingerprint, nor does it modify or modulate the RF fingerprint in any simple manner. The interaction between the enhancement and the RF fingerprint is ultimately an analog phenomenon, being the result of interactions between changes to the phase/frequency/amplitude of the RF pulses, as produced by the DAC, and a multitude of nonlinearities, resonances, and other analog electronic and structural features of the transmitter modules that are downstream of the DAC.

In embodiments, the RF fingerprint is then detected 314 by analysis of the abstracted received signal 312. In some of these embodiments, the receiver 302 is separately trained to detect RF fingerprints, for example using a deep regenerative model (DGM) combined with Hierarchical Bayesian Program Learning (HBPL), so as to enable the receiver 302 to abstract the received signal into an abstracted space 312 within which abstracted RF fingerprints are represented in a manner that causes the abstracted fingerprints from various RF transmitters 300 to be distinguishable from each other.

In some embodiments the "direct" effect of the enhancement is reversed and in various embodiments the digital signal 102, which is known to the receiver 302, is subtracted or otherwise taken into account. In similar embodiments, the digital signal 102 is subtracted from the received signal 310 immediately after it is digitized. At this point, in principle, only the RF fingerprint remains, in combination with the "fingerprint" of the receiver and any noise that managed to enter into the result.

Upon detection 314, the RF fingerprint is analyzed to determine its discriminability, and a degree of success in accomplishing the primary purpose of the digital signal is determined, based for example on the evaluation provided by the communications evaluator 318 of the signal source, and/or on the bit error rate (if any) of the received signal. Embodiments decode the received signal 324 and perform a communications evaluation 326. In some of these embodiments, the decoded signal is compared with the original digital signal 102 so as to estimate the degree of success in accomplishing the primary purpose.

An enhancement generator 320 then creates a new, modified candidate enhancement, and the process is repeated until a successful enhancement is found for which the discriminability of the RF fingerprint 314 is above a defined minimum discriminability, while at the same time the degree of success in accomplishing the primary purpose of the digital signal is greater than a defined minimum degree of success. In embodiments, reinforcement learning is used to direct the modifications by the enhancement generator 320 to the candidate enhancements through a learned and informed framework that is data-driven. Embodiments apply machine learning methods, such as deep learning and reinforcement learning, to direct the variation of the candidate enhancements during the training phase. Some of these embodiments apply DGM and HBPL to the machine learning.

In various embodiments the enhancement generator 320 represents the signal as a layer within a deep generative model (DGM), wherein a "weight" is associated with each node or "dimension" of the layer, and the enhancement generator 320 generates the candidate enhancements by altering the weights of the DGM layer.

In embodiments, the effects on the RF fingerprint of specific variations of the candidate enhancement 306 are explored, such as the effects of varying the abstracted signal along individual dimensions within the "reduced" dimensionality of the abstracted space. This analysis can be used by the enhancement generator 320 to generate modified enhancements that will likely improve the discriminability of the RF fingerprint.

It is fundamental to the presently disclosed method that it does not depend upon a detailed analysis of the origins of the RF fingerprint. Indeed, the difficulty of performing such an analysis goes to the heart of why RF fingerprints are nearly impossible to duplicate or spoof. Instead, the present method depends upon a training approach, whereby the effects of various candidate enhancements on the discriminability of the RF fingerprint are analyzed, as described above with reference to FIG. 3. Embodiments apply sophisticated machine learning methods to this approach, such as deep learning and reinforcement learning, to direct the variation of the candidate enhancements 320 during the training phase. However, no detailed analysis is attempted as to how various specific and individual analog elements within the transmitter 100 will respond to the candidate enhancements 306, or how they will contribute to the overall RF fingerprint.

The successful enhancement is then implemented in the transmission source 300, and the transmission source 300 is put into operation. The enhancement that is implemented in the transmission source 300 and the RF fingerprint of the RF transmission source 300 that corresponds to the implemented enhancement are made known to RF receivers (item 500 in FIG. 5) that are likely to receive transmissions from the transmission source 300 and may be required to detect and verify the RF fingerprint of the RF transmission source 300.

Figure 5:
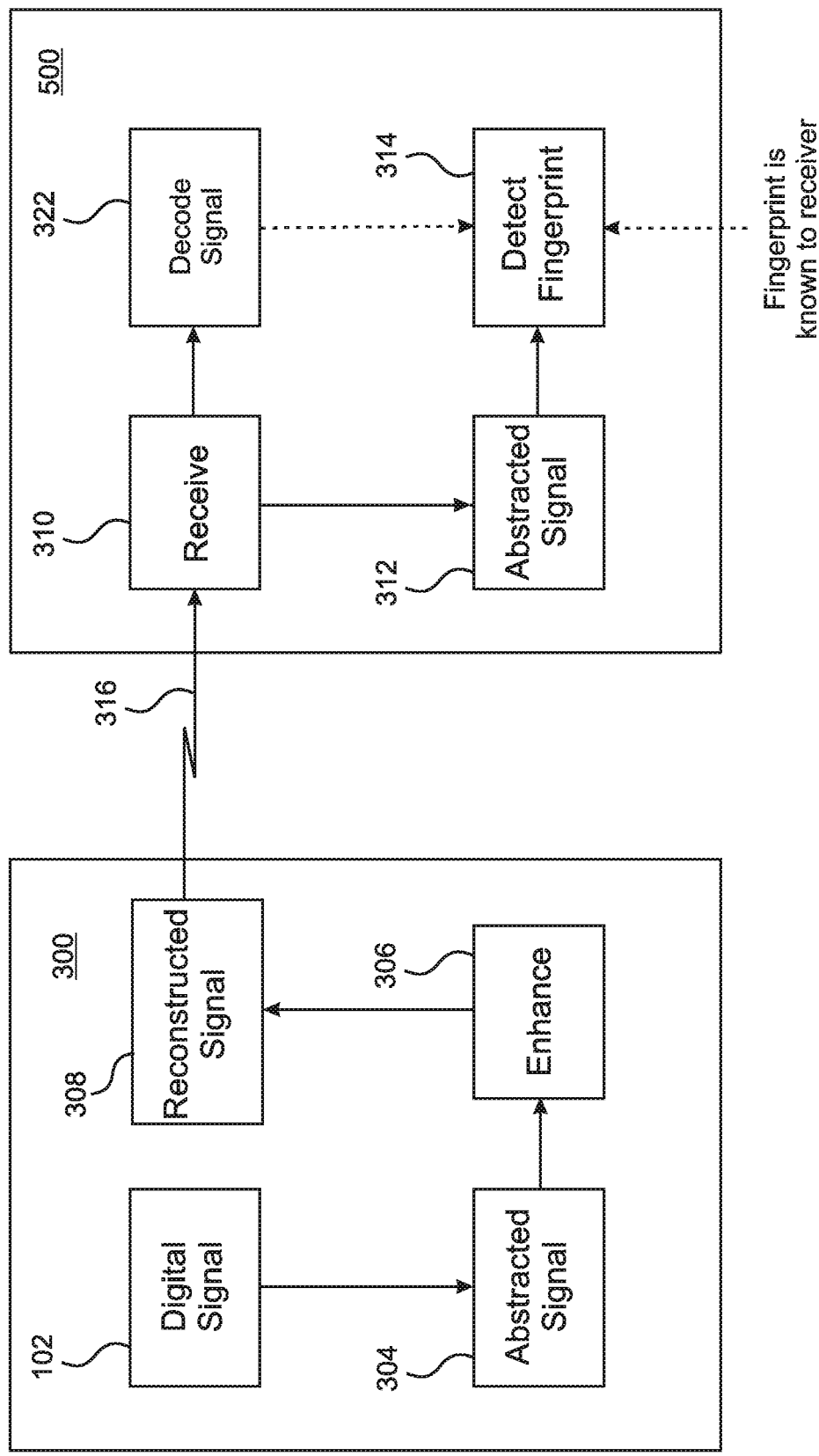
FIG. 5 is a flow diagram that illustrates the embodiment of FIG. 3 during an operational phase.

With reference to FIG. 5, during operation both the RF fingerprint of the RF transmission source 300 and the "successful" enhancement that has been implemented in that RF transmission source 306 are known to the receiver 500, as well as the abstraction method that is being utilized 304. This information is applied by the receiver 500 of the RF transmissions to isolate and detect the RF fingerprint 314 in the presence of noise and other distortions. Note that the successful enhancement 306 was evaluated by the communications evaluator 318 to ensure that it would not significantly degrade the primary purpose of the RF transmission. Accordingly, the receiver 500 is able to decode 322 the received signal in a conventional manner to extract the transmitted primary data.

Figure 6:
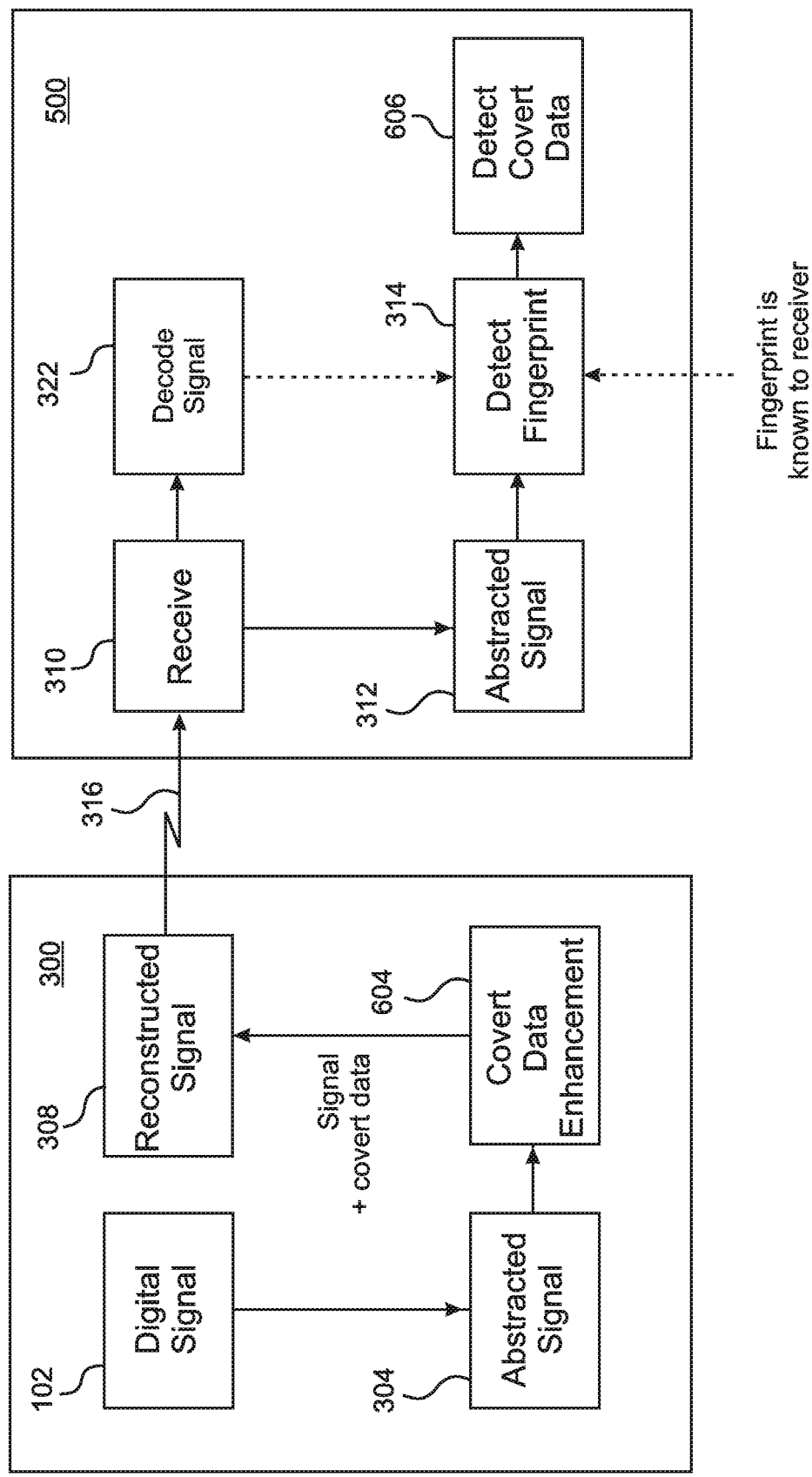
FIG. 6 is a flow diagram that illustrates an embodiment of the disclosed method in which covert data is embedded within the abstracted signal, whereby the covert data is covertly communicated to a receiver.

With reference to FIG. 6, in some embodiments covert data such as a covert message is applied as the enhancement 604. For example, in embodiments the effects on the RF fingerprint of specific perturbations of the abstracted signal are explored and characterized, such as effects of perturbing the abstracted signal along individual dimensions within the dimensionality of the abstracted space. Once these relationships have been characterized by analysis of results obtained during the training phase, they can be used to encode covert data onto the RF fingerprint by applying the covert data as specific perturbations of the abstracted signal 604 that will result in detectable perturbations of the RF fingerprint. The covert data can then be recovered 606 from the received signal by observing variations in the detected RF fingerprint 314 and applying the known relationships between perturbations of the abstracted signal and corresponding RF fingerprint variations.

The encoded covert data thereby operates in these embodiments as a covert data "enhancement" that is applied 604 to the abstracted signal in a manner that is similar to the method described above, except that the primary goal of the covert data enhancement is to encode the covert data onto the RF fingerprint, rather than to enhance the discriminability of the RF fingerprint. Nevertheless, in embodiments the covert data enhancement accomplishes both goals, i.e. encodes the covert data onto the RF fingerprint and also enhances the discriminability of the RF fingerprint.

According to this approach, the covert data is essentially encoded and encrypted as the enhancement that is applied to the RF fingerprint, so that the fingerprint is modulated by the covert data. Because the covert data 604 is applied to the digital data in its abstracted form, i.e. before the data is mapped back, the difficulty of detecting the presence of covert information 604 encoded within the RF signal is greatly increased.

Note that various embodiments directed to increasing the discriminability of the RF fingerprint, such as the embodiment of FIG. 5, typically apply time invariant enhancements to the abstracted signal 306, whereas embodiments that encode and transmit covert data according to the present method in embodiments such as FIG. 6 typically requires application of a time varying covert data enhancement 604 to the abstracted signal, which results in a time-varying fluctuations of the RF fingerprint.

Figure 7:
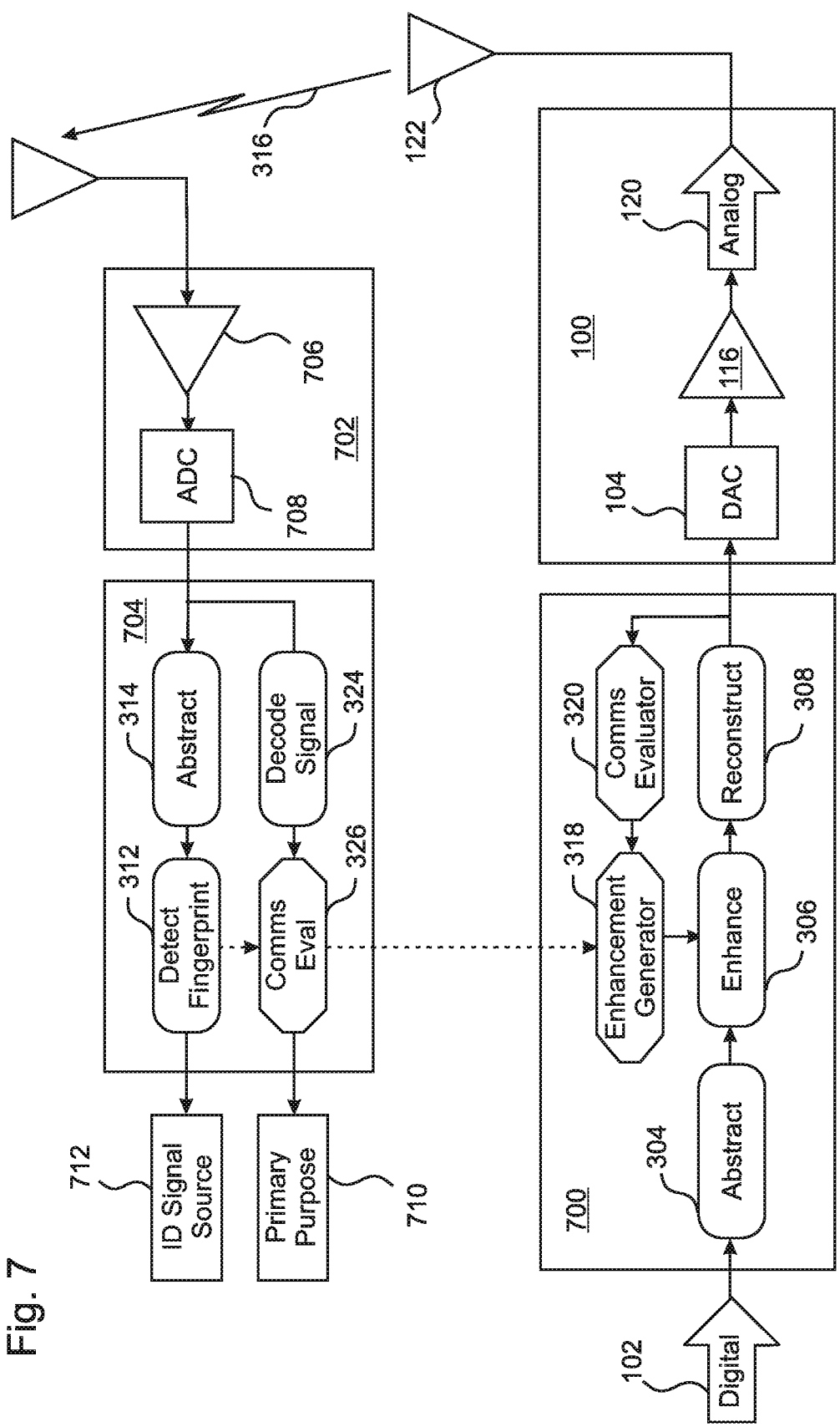
FIG. 7 is a block diagram of an RF transmission source and an RF signal receiver in an embodiment of the present disclosure.

Referring to FIG. 7, a system perspective 700 is illustrated showing an RF preprocessor 700 that accepts a digital signal 102 as input, which is then abstracted 304, enhanced 306, and reconstructed 308 before being directed to the RF signal source 100, where it is converted to an analog signal by a DAC 104, amplified 116, and directed to a transmitting antenna 122.

During the initial training phase, the RF preprocessor also includes the enhancement generator 318 that generates candidate enhancements, and in embodiments also a communications evaluator 320 that evaluates the enhanced reconstructed signals to estimate a degree of success in accomplishing the primary purpose of the transmission, so as to rule out candidate enhancements that would unduly degrade the ability of the transmission to achieve its primary purpose. Note that modules which are only used during training are represented in the figure as 8-sided elements.

Also shown in FIG. 7 is an RF signal receiver 702 that includes a preamplifier 706 and an analog-to-digital converter (ADC) 708 configured to amplify and digitize the received RF transmission before directing it to an RF postprocessor 704 in which the received RF signal is decoded 324 so as to complete its primary purpose 710, and in which the received RF signal is also abstracted 314 and then analyzed to detect 312 the RF fingerprint of the RF signal source 100. Comparison of the RF fingerprint with a database of known RF fingerprints then allows the identity of the RF signal source to be confirmed 712.

During the initial training phase, in embodiments the RF signal postprocessor also evaluates the decoded signal 326 to determine a degree of success in accomplishing the primary purpose 710 of the signal, and provides the analysis to the enhancement generator 318.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of detecting an RF fingerprint of an RF transmission source, the method comprising:
   A) abstracting a digital signal by applying thereto a non-linear data compression method that can be reconstructed by a mapping back method, said digital signal having a primary purpose;
   B) enhancing the abstracted digital signal by applying an operational enhancement thereto;
   C) reconstructing the enhanced, abstracted digital signal by applying thereto the mapping back method;
   D) causing the RF transmission source to convert the reconstructed enhanced digital signal into an enhanced analog signal, and to transmit the enhanced analog signal to a receiver;
   E) causing the receiver to convert the enhanced analog signal into an enhanced received digital signal;
   F) abstracting the enhanced received digital signal by applying thereto the non-linear data compression method; and
   G) detecting an RF fingerprint included in the abstracted enhanced received digital signal,
   wherein the non-linear data compression method used for abstraction in steps A) and F) is an auto-encoder or a deep generative model (DGM).

2. The method of claim 1, wherein the primary purpose of the digital signal is communication of data to the receiver.

3. The method of claim 1, wherein the primary purpose of the digital signal is detection of a remote object by RADAR.

4. The method of claim 1, wherein the non-linear data compression method that is used for abstraction in steps A) and F) includes representing the signal as a layer within the DGM, said layer being characterized by a plurality of nodes having corresponding weights, and wherein the enhancement that is applied in step B) includes altering at least one of the weights of the layer.

5. The method of claim 1, wherein detecting the RF fingerprint in step G) includes application of a deep regenerative model (DGM) to the abstracted enhanced received digital signal.

6. The method of claim 5, wherein detecting the RF fingerprint in step G) further includes applying Hierarchical Bayesian Program Learning (HBPL) to the abstracted enhanced received digital signal.

7. The method of claim 1, wherein the operational enhancement is determined according to a training phase comprising:
   I) applying steps A) through G) using a candidate enhancement in step B);
   II) determining a discriminability of the RF fingerprint detected in step G);
   III) determining a degree of success in accomplishing the primary purpose of the digital signal;
   IV) repeating steps I) through III), each time with a modified candidate enhancement, until a successful enhancement is identified for which the discriminability of the RF fingerprint is greater than a defined minimum discriminability, and the degree of success in accomplishing the primary purpose of the digital signal is greater than a defined minimum degree of success; and
   V) designating the successful enhancement as the operational enhancement.

8. The method of claim 7, wherein reinforcement learning is used in step IV) to direct the modifications to the candidate enhancements through a learned and informed framework that is data-driven.

9. The method of claim 8, wherein the reinforcement learning includes applying a deep regenerative model (DGM) to the candidate enhancements.

10. The method of claim 9, wherein the reinforcement learning further includes applying Hierarchical Bayesian Program Learning (HBPL) to the candidate enhancements.

11. A method of conveying covert data from an RF transmission source to a receiver, the method comprising:
    abstracting a digital signal by applying thereto a non-linear data compression method that can be reconstructed by a mapping back method;
    encoding the covert data as a covert data enhancement;
    enhancing the abstracted digital signal by applying the covert data enhancement to the abstracted digital signal;
    reconstructing the enhanced, abstracted digital signal by applying thereto the mapping back method;
    causing the RF transmission source to convert the reconstructed enhanced digital signal into an enhanced analog signal, and to transmit the enhanced analog signal to the receiver;
    causing the receiver to convert the enhanced analog signal into an enhanced received digital signal;
    abstracting the enhanced received digital signal by applying thereto the non-linear data compression method;
    detecting an RF fingerprint included in the abstracted enhanced received digital signal;
    extracting the covert data enhancement from the RF fingerprint;
    recovering the coded data from the extracted covert data enhancement; and
    characterizing effects of perturbing the abstracted signal along individual dimensions within the dimensionality of an abstracted space;
    wherein encoding the covert data as a covert data enhancement includes encoding the covert data as specific perturbations of the abstracted signal that will result in detectable perturbations of the RF fingerprint.

12. The method of claim 11, wherein the primary purpose of the digital signal is communication of data to the receiver.

13. The method of claim 11, wherein the primary purpose of the digital signal is detection of a remote object by RADAR.

14. The method of claim 11, wherein the non-linear data compression method uses a generative approach.

15. The method of claim 14, wherein the generative approach is a deep generative model (DGM).

16. The method of claim 15, wherein the non-linear data compression method includes representing the signal as a layer within the DGM, said layer being characterized by a plurality of nodes having corresponding weights, and wherein the enhancement that is applied in step B) includes altering at least one of the weights of the layer.

17. The method of claim 11, wherein the non-linear data compression method used for abstraction is an auto-encoder.

18. The method of claim 11, wherein detecting an RF fingerprint included in the abstracted enhanced received digital signal includes applying a deep regenerative model (DGM) to the abstracted enhanced received digital signal.

19. The method of claim 18, wherein detecting the RF fingerprint included in the abstracted enhanced received digital signal further includes applying Hierarchical Bayesian Program Learning (HBPL) to the abstracted enhanced received digital signal.

20. An RF signal source comprising:
    a digital to analog converter (DAC);
    an RF amplifier;
    a transmitting antenna; and
    an RF preprocessor, configured to:
    A) accept a digital signal as an input, and abstract the digital signal by applying thereto a non-linear data compression method that can be reconstructed by a mapping back method, said digital signal having a primary purpose;
    B) enhance the abstracted digital signal by applying an operational enhancement thereto, wherein the operational enhancement is a covert data enhancement applied to the abstracted digital signal, wherein the covert data enhancement includes encoding covert data as specific perturbations of the abstracted signal that results in detectable perturbations of an RF fingerprint;
    C) reconstruct the enhanced, abstracted digital signal by applying thereto the mapping back method;
    D) cause the DAC to convert the reconstructed enhanced digital signal into an enhanced analog signal;
    E) cause the RF amplifier to amplify the enhanced analog signal; and
    F) cause the transmitting antenna to transmit the enhanced analog signal.

21. An RF signal receiver, comprising:
    a receiving antenna, configured to receive an enhanced analog signal transmitted by an RF signal source, said enhanced analog signal having been derived from a digital signal that was enhanced after application thereto of a non-linear data compression method that can be reconstructed by a mapping back method, said enhanced analog signal having a primary purpose;
    an analog signal preamplifier, configured to amplify the enhanced analog signal received by the receiving antenna;
    an analog to digital converter (ADC), configured to convert the amplified enhanced analog signal into an enhanced received digital signal; and
    an RF post-processor configured to:
    I) accept the enhanced received digital signal from the ADC;
    II) abstract the enhanced received digital signal by applying thereto the non-linear data compression method; and
    III) detect an RF fingerprint of the RF signal source included in the abstracted enhanced received digital signal, wherein detecting the RF fingerprint includes application of a deep regenerative model (DGM) to the abstracted enhanced received digital signal.

* * * * *